(12) United States Patent
Fujii et al.

(10) Patent No.: US 6,532,858 B2
(45) Date of Patent: Mar. 18, 2003

(54) ELECTRIC COMPRESSOR

(75) Inventors: Toshiro Fujii, Kariya (JP); Kazuo Murakami, Kariya (JP); Yasuharu Odachi, Kariya (JP); Yoshiyuki Nakane, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/766,744

(22) Filed: Jan. 22, 2001

(65) Prior Publication Data

US 2001/0013271 A1 Aug. 16, 2001

(30) Foreign Application Priority Data

Jan. 24, 2000 (JP) ........................... 2000-014311

(51) Int. Cl.[7] ................................................. F01B 3/00
(52) U.S. Cl. ........................ 92/71; 417/410.1; 417/410.3
(58) Field of Search .................... 417/321, 410.1, 417/410.3; 92/71; 91/499

(56) References Cited

U.S. PATENT DOCUMENTS 4,030,404 A    6/1977   Meijer ........................ 92/12.2
4,033,707 A  * 7/1977   Stutzman ..................... 417/312

FOREIGN PATENT DOCUMENTS

| JP | 5-187356 | 7/1993 | ........... F04B/27/08 |
| JP | 05 187356 A | 7/1993 | ........... F04B/27/08 |

* cited by examiner

*Primary Examiner*—Edward K. Look
*Assistant Examiner*—Igor Kershteyn
(74) *Attorney, Agent, or Firm*—Morgan & Finnegan, LLP

(57) ABSTRACT

An electric compressor includes a rotary shaft that is driven by an electric motor. The motor generates driving torque. Pistons compress gas in accordance with rotation of the rotary shaft. During one turn of the rotary shaft, the times when the net load torque generated by the pistons is minimum and the times when the driving torque of the motor is minimum occur at substantially the same rotation angles of the rotary shaft. Also, during one turn of the rotary shaft, the times when the net load torque is maximum and the times when the driving torque of the motor is maximum occur at substantially the same rotation angles of the rotary shaft. The driving torque is always greater than the net load torque. Therefore, the motor need not be large to generate sufficient torque.

19 Claims, 8 Drawing Sheets

Fig.7(a)    Fig.7(b)
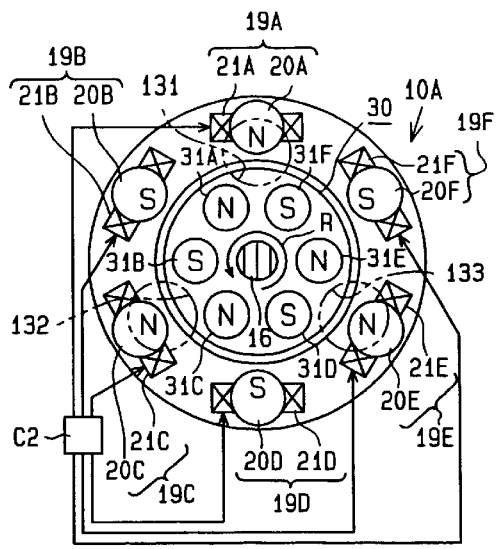
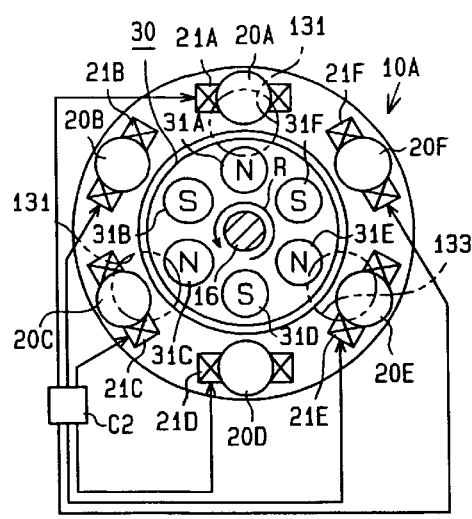
Fig.7(c)
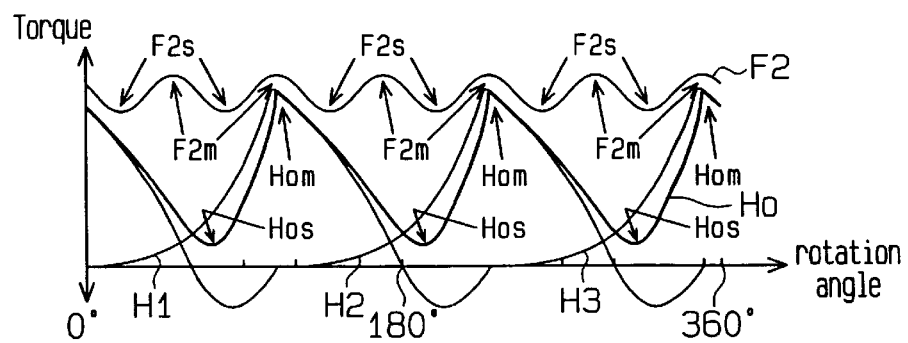
Fig.7(d)
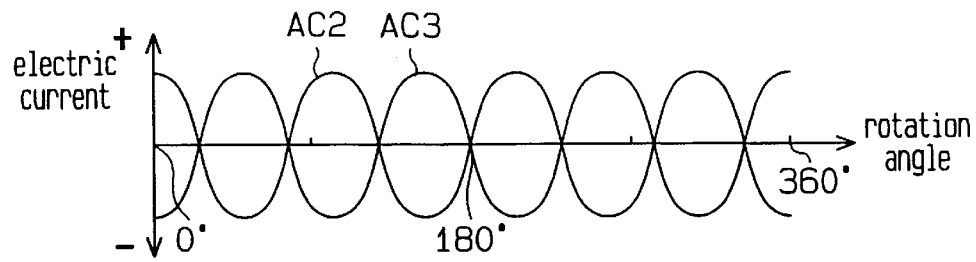

ELECTRIC COMPRESSOR

BACKGROUND OF THE INVENTION

The present invention relates to an electric compressor driven by an electric motor.

Japanese Unexamined Patent Publication No. 5-187356 discloses an electric compressor, the rotary shaft of which is driven by an electric motor. The compressor has several cylinder bores. A piston is accommodated in each cylinder bore. The pistons are arranged at equal angular intervals about the axis of the rotary shaft. A drive plate is fixed to the rotary shaft. A swash plate and a piston support are located between the drive plate and the pistons. The piston support is supported by a thrust bearing. The thrust bearing permits the piston support to rotate relative to the swash plate.

A guide groove is formed in the drive plate. A pivot pin, which is fixed to the swash plate, is engaged with the guide groove. A sleeve is slidably supported by the rotary shaft. The swash plate is supported by a pair of sleeve pins, which are formed on the sleeve, such that the swash plate inclines. Inclination of the swash plate is guided by engagement between the guide groove and the pivot pin and sliding of the sleeve. As the swash plate rotates, the piston support pivots and reciprocates each piston in the corresponding cylinder bore. When gas is compressed in each cylinder bore and is discharged from the cylinder bore, a compression reaction force is generated. The compression reaction force is transmitted to and received by the drive plate through the pistons, the piston support, the thrust bearing, the swash plate and the pivot pin.

The compression reaction force applies load torque on the rotary shaft. The load torque generated by each piston is maximized during the discharge stroke, in which gas is discharged from the cylinder bore. The load torque is substantially zero during the suction stroke, in which gas is drawn into the cylinder bore. The net load torques of the pistons is maximized a number of times that correspond to the number of the pistons during one turn of the rotary shaft.

The driving torque generated by the rotary shaft is always greater than the maximum value of the net load torque. The driving torque is determined by taking only the maximum value of the net load torque generated by the compression reaction force into account. Since changes of the net load torque are not considered, the driving torque is excessive when the net load torque has a small value. Thus, an electric motor that generates excessive torque is used. The motor, which generates excessive torque, is relatively large, which increases the size of the compressor.

SUMMARY OF THE INVENTION

Accordingly, it is an objective of the present invention to provide a compact electric compressor.

To achieve the foregoing and other objectives and in accordance with the purpose of the present invention, an electric compressor is provided. The electric compressor includes an electric motor that generates driving torque, a rotary shaft driven by the motor and a compression member for compressing gas in accordance with rotation of the rotary shaft. During one turn of the rotary shaft, at least one time when the net load torque generated in the compression member is minimum and one time when the driving torque of the motor is minimum occur at substantially the same rotation angle of the rotary shaft or at least one time when the net load torque is maximum and one time when the driving torque of the motor is maximum occur at substantially the same rotation angle of the rotary shaft. The magnitude of the driving torque is always greater than that of the net torque.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7(a) is a diagrammatic view showing an electric motor according to a second embodiment of the present invention in which magnets are rotated from iron cores by thirty degrees;

FIG. 7(b) is a diagrammatic view showing the motor of FIG. 7(a) in which the iron cores face the magnets;

FIG. 7(c) is a graph showing changes of a net load torque and changes of a driving torque in the motor of FIGS. 7(a) and 7(b);

FIG. 7(d) is a graph showing electricity supplied to the stator coils in the motor of FIGS. 7(a) and 7(b);

DETAILED DESCRIPTION OF THE PREFERRED EMBODIMENTS

A piston type compressor according to a first embodiment of the present invention will now be described with reference to FIGS. 1 to 6.

Figure 1:
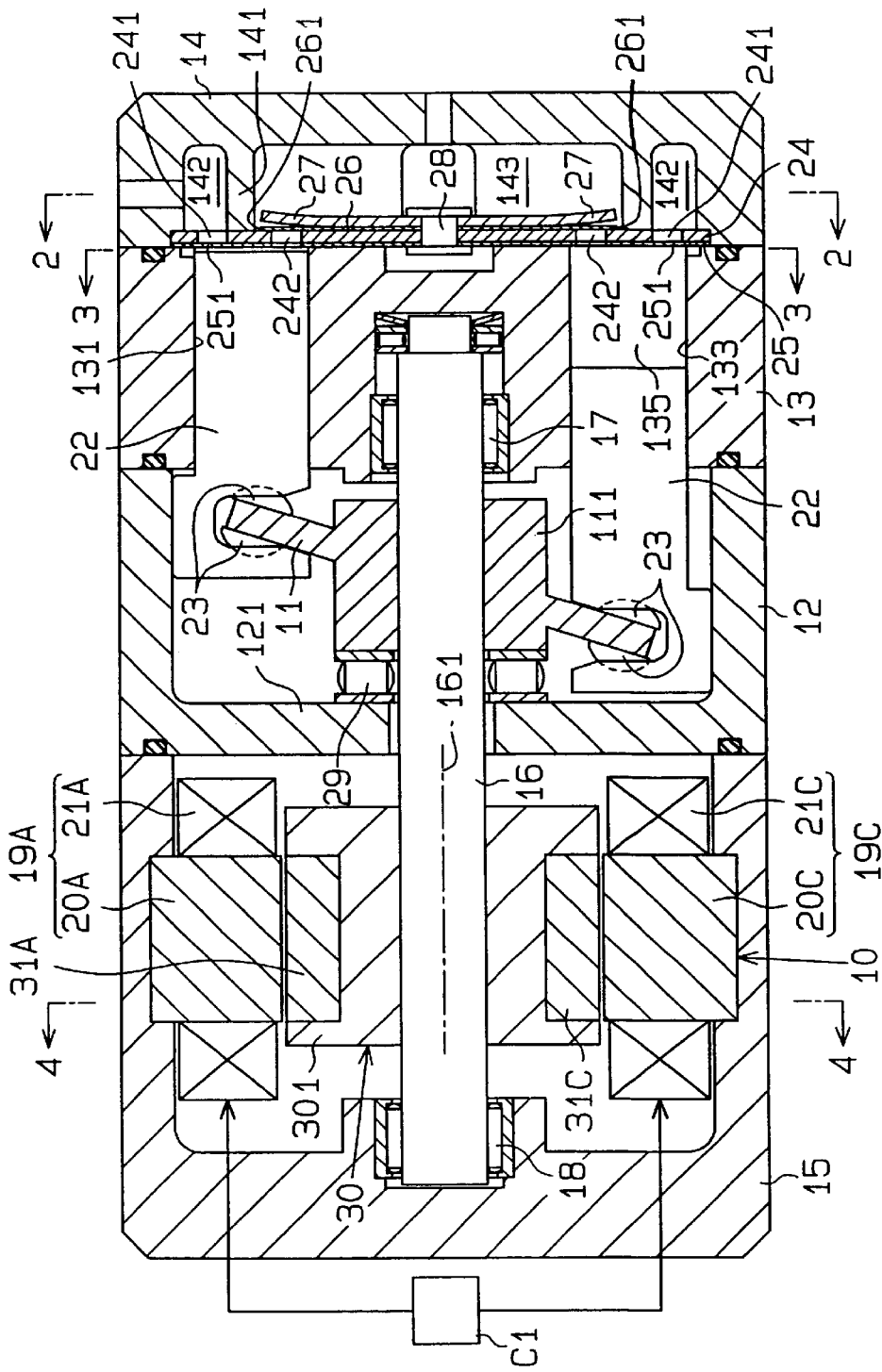
FIG. 1 is a cross-sectional view illustrating an electric compressor according to a first embodiment of the present invention.

As shown in FIG. 1, a cylinder block 13 and a motor housing member 15 are coupled to a center housing member 12. A swash plate 11 is accommodated in the center housing member 12 and is fixed to a rotary shaft 16. An end housing member 14 is secured to the cylinder block 13. The rotary shaft 16 is supported by the motor housing member 15 and the cylinder block 13 through radial bearings 17, 18.

Figure 4:
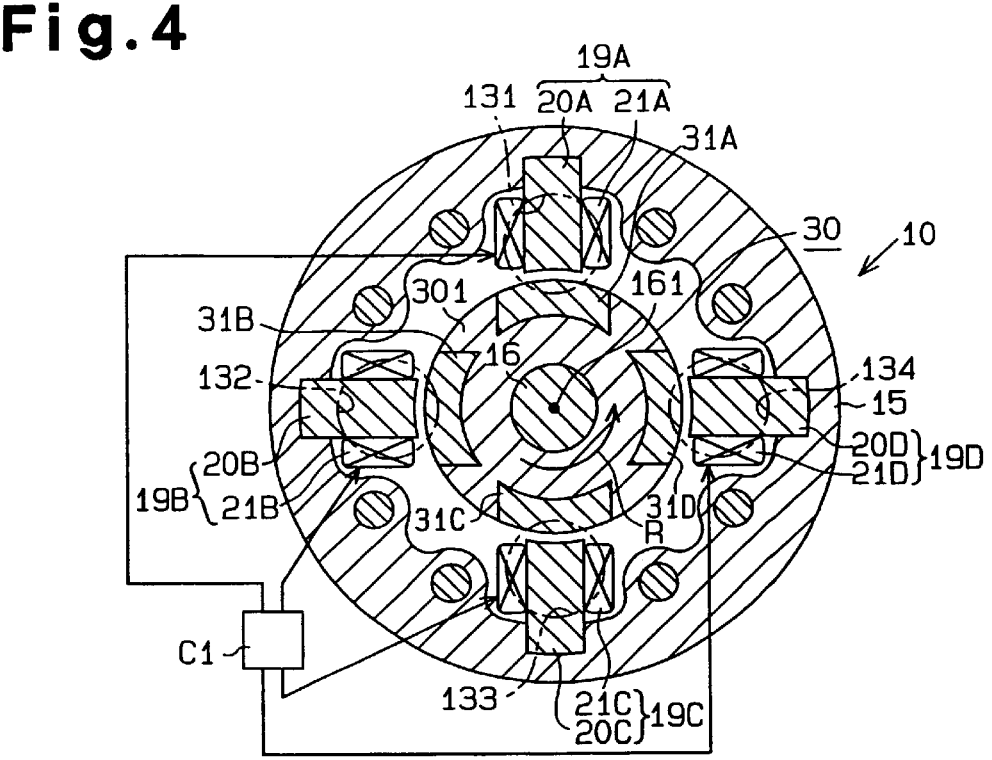
FIG. 4 is a cross-sectional view taken along line 4—4 of FIG. 1.

As shown in. FIGS. 1 and 4, several stators, which are four stators 19A, 19B, 19C, 19D in this embodiment, are located on the inner surface of the motor housing member 15. A rotor 30 is fixed to the rotary shaft 16 in the motor housing member 15. The stators 19A, 19B, 19C, 19D have iron cores 20A, 20B, 20C, 20D and coils 21A, 21B, 21C, 21D, respectively. The coils 21A, 21B, 21C, 21D are wound about the iron cores 20A, 20B, 20C, 20D, respectively. The rotor 30 includes a support cylinder 301 fixed to the rotary shaft 16 and magnets 31A, 31B, 31C, 31D fixed to the surface of the support cylinder 301. The number of the magnets 31A, 31B, 31C, 31D is the same as the number of the iron cores 20A, 20B, 20C, 20D. The iron cores 20A, 20B, 20C, 20D are arranged at equal angular intervals (ninety degrees) about the axis 161 of the rotary shaft 16. The magnets 31A, 31B, 31C, 31D are also arranged about the axis 161 of the rotary shaft 16 at equal angular intervals (ninety degrees).

The N poles of one opposite pair 31A, 31C of the magnets are located radially outside, and the S poles of the remaining pair 31B, 31D are located radially outside. When electric current is supplied to the coils 21A, 21B, 21C, 21D, the rotor 30 is rotated. The rotary shaft 16 and the swash plate 11 are rotated integrally with the rotor 30. The stators 19A, 19B, 19C, 19D and the rotor 30 form an electric motor 10.

Figure 3:
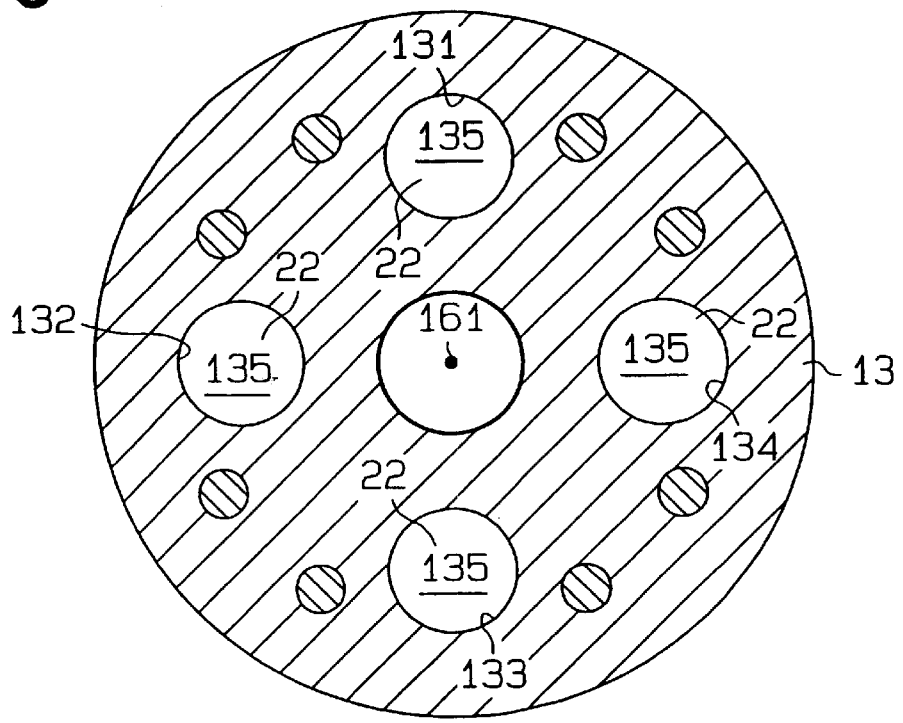
FIG. 3 is a cross-sectional view taken along line 3—3 of FIG. 1.

As shown in FIG. 3, several cylinder bores, which are four cylinder bores 131, 132, 133, 134 in this embodiment, are formed in the cylinder block 13. The cylinder bores 131, 132, 133, 134 are arranged about the axis 161 of the rotary shaft 16 at equal angular intervals. Each of the cylinder bores 131, 132, 133, 134 accommodates a piston 22. Each piston 22 defines a compression chamber 135 in the corresponding cylinder bores 131, 132, 133, 134.

As shown in FIG. 1, a pair of shoes 23 is located between each piston 22 and the swash plate 11. The force of rotation of the swash plate 11 is transmitted to the pistons 22 by the shoes 23. As swash plate 11 rotates, each piston 22 reciprocates in the corresponding cylinder bores 131, 132, 133, 134.

Figure 2:
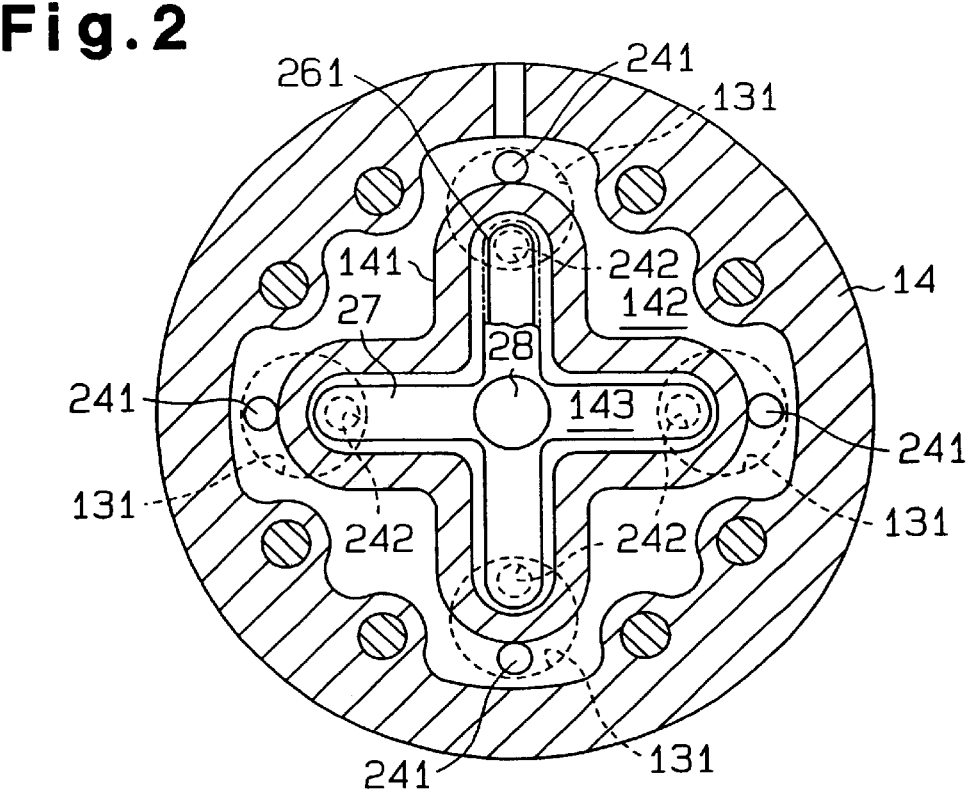
FIG. 2 is a cross-sectional view taken along line 2—2 of FIG. 1.

A main plate 24 and a first sub plate 25 are located between the end housing member 14 and the cylinder block 13. As shown in FIG. 2, the interior of the end housing member 14 is divided into a suction chamber 142 and a discharge chamber 143 by a wall 141.

As shown in FIG. 1, a second sub plate 26 and a retainer 27 are fastened to the main plate 24 in the discharge chamber 143 by a rivet 28. Suction ports 241 are formed in the main plate 24. Each suction port 241 is aligned with the suction chamber 142 and one of the cylinder bores 131, 132, 133, 134. Discharge ports 242 are formed in the main plate 24 and the first sub plate 25. Each discharge port 242 is aligned with the discharge chamber 143 and one of the cylinder bores 131, 132, 133, 134. Suction valve flaps 251 are formed on the first sub plate 25. Discharge valve flaps 261 are formed on the second sub plate 26. The suction valve flaps 251 open and close the suction ports 241. The discharge valve flaps 261 open and close the discharge ports 242.

When each piston 22 is moved from the top dead center position to the bottom dead center position, refrigerant gas in the suction chamber 142 is drawn into the corresponding compression chamber 135 through the corresponding suction port 241 while flexing the suction valve flap 251 to an open position. As the piston 22 is moved from the bottom dead center position to the top dead center position, the refrigerant gas is discharged to the discharge chamber 143 through the discharge port 242 while flexing the corresponding discharge valve flap 261 to an open position. The opening size of each valve flap 261 is limited by the retainer 27. The suction chamber 142 is connected to the discharge chamber 143 by an external refrigerant circuit (not shown). Refrigerant discharged from the discharge chamber 143 returns to the suction chamber 142 through a condenser, an expansion valve and an evaporator of the external refrigerant circuit.

A thrust bearing 29 is located between the swash plate 11 and a wall 121 of the center housing member 12. When each piston 22 is moved from the bottom dead center position to the top dead center position, a compression reaction force is generated by refrigerant gas discharged from the compression chamber 135 to the discharge chamber 143. The compression reaction force is received by the wall 121 through the piston 22, the shoes 23, the swash plate 11 and the thrust bearing 29.

Figure 5:
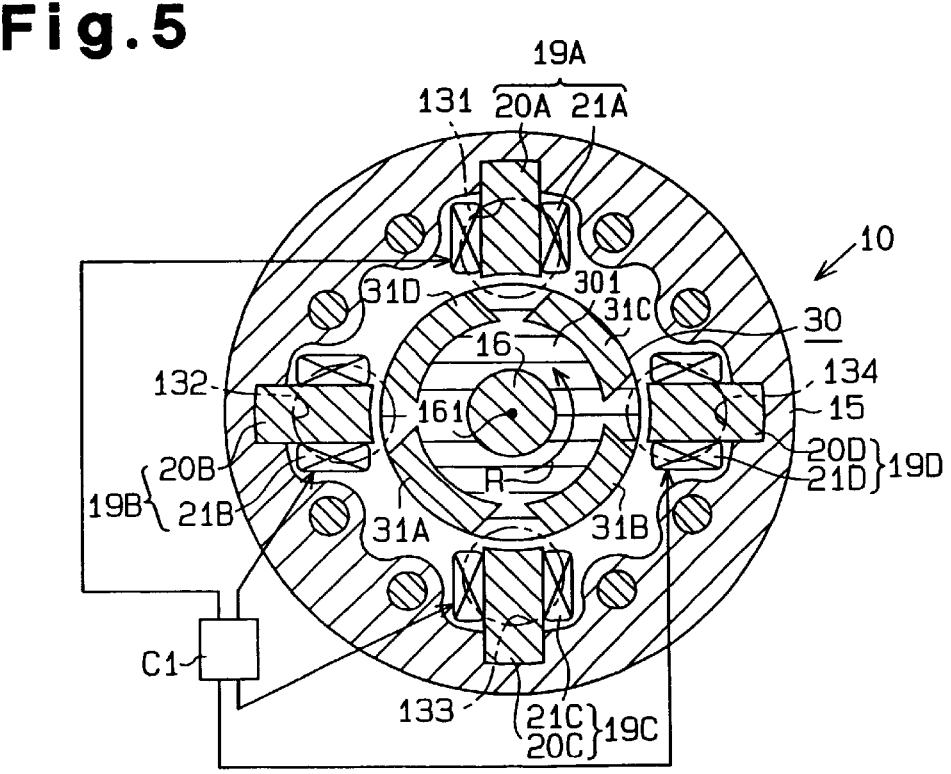
FIG. 5 is a cross-sectional in which the rotary shaft is rotated by one hundred thirty-five degrees from the state of FIG. 4.

When the rotary shaft 16 is at the rotation angle shown in FIG. 4, the piston 22 in the upper cylinder bore 131 of FIG. 1 is at the top dead center position and the piston 22 in the opposite cylinder bore 133 is at the bottom dead center position, as shown in FIG. 1. The rotation angle of the rotary shaft 16 of FIG. 4 is defined as zero degrees. In the state of FIG. 4, the piston 22 in the cylinder bore 132 is in the discharge stroke, or is being moved from the bottom dead center position to the top dead center position, and the piston 22 in the cylinder bore 134 is in the suction stroke, or is being moved from the top dead center position to the bottom dead center position. As shown in FIG. 4, the iron core 20A faces the magnet 31A, the iron core 20B faces the magnet 31B, the iron core 20C faces the magnet 31C and the iron core 20D faces the magnet 31D. FIG. 5 illustrates a state in which the rotary shaft 16 is rotated from the state of FIG. 4 in a direction of arrow R by one hundred thirty-five degrees.

Figure 6A:
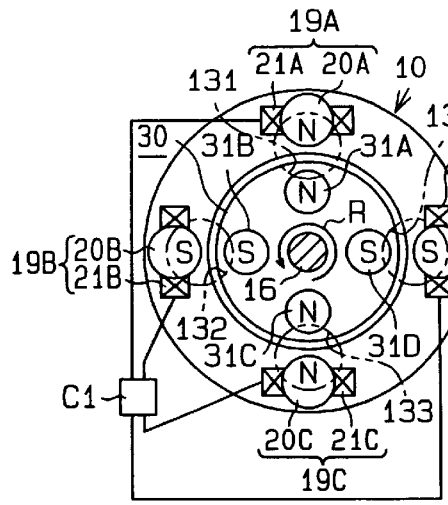
FIG. 6(a) is a diagrammatic view showing the electric motor in the state of FIG. 4.
Figure 6B:
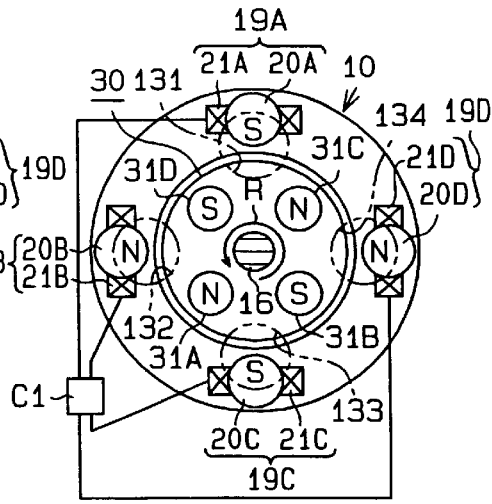
FIG. 6(b) is a diagrammatic view showing the electric motor in the state of FIG. 5.

FIG. 6(a) is a diagrammatic view of FIG. 4, and FIG. 6(b) is a diagrammatic view of FIG. 5. The symbol "N" on the magnets 31A, 31C indicates N poles, and the symbol "S" on the magnets 31B, 31D indicates S poles.

Figure 6C:
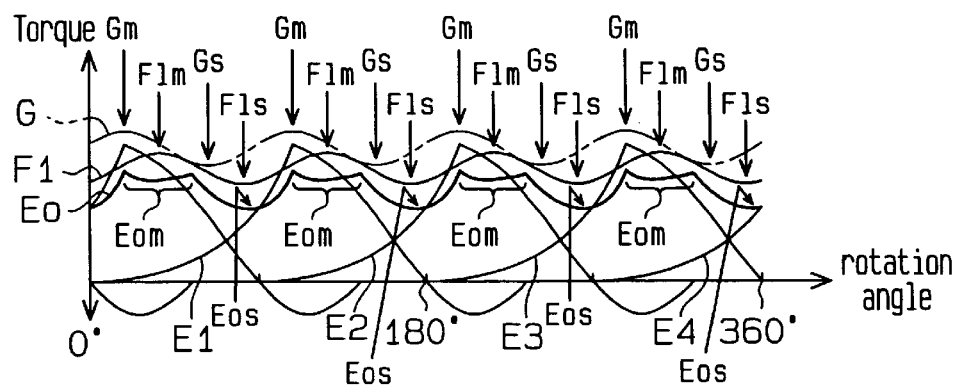
FIG. 6(c) is a graph showing changes of a net load torque and changes of a driving torque in the motor of FIGS. 6(a) and 6(b)

Lines E1, E2, E3, E4 of FIG. 6(c) represent load torques of the rotary shaft 16 generated by compression reaction forces in the compression chambers 135 of the cylinder bores 131, 132, 133, 134, respectively. Line Eo represents the resultant of the torques, or the net torque, represented by lines E1, E2, E3, E4. The horizontal axis represents the rotation angle of the rotary shaft 16. The net torque Eo changes periodically at rotation angles of ninety degrees. As shown in FIGS. 4 and 6(a), the net torque Eo has minimum points at locations labeled Eos, which occur at rotation angles of zero degrees, ninety degrees, one hundred eighty degrees, and two hundred seventy degrees. The iron cores 20A, 20B, 20C, 20D face the magnets 31A, 31B, 31C, 31D at the minimum points Eos. The net torque Eo has maximum points at locations labeled Eom, which occur at rotation angles of forty-five degrees, one hundred and thirty-five degrees, two hundred and twenty-five degrees and three hundred and fifteen degrees. The iron cores 20A, 20B, 20C, 20D are displaced from the magnets 31A, 31B, 31C, 31D by approximately forty five degrees, as shown in FIGS. 5 and 6(b), at the maximum points Eom.

Figure 6D:
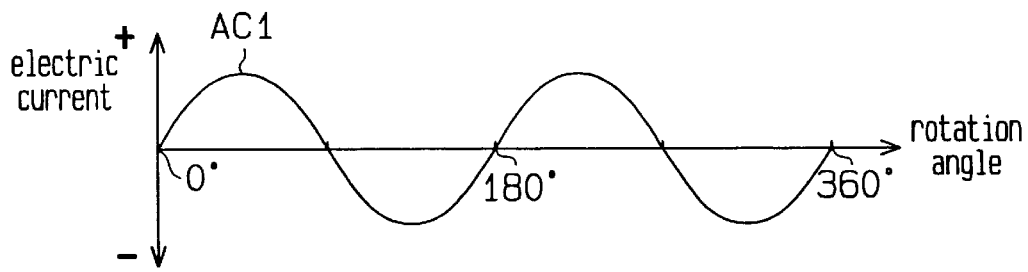
FIG. 6(d) is a graph showing electricity supplied to the stator coils in the motor of FIGS. 6(a) and 6(b)

As shown in FIGS. 1, 4 and 5, the coils 21A, 21B, 21C, 21D are connected to a controller C1. The controller C1 supplies alternating current AC1, which is shown in FIG. 6(d), to the coils 21A, 21B, 21C, 21D. The horizontal axis of FIG. 6(d) represents the rotation angle of the rotary shaft 16.

When the rotation angle of the rotary shaft 16 is zero degrees as shown in FIG. 6(a), the alternating current AC1 supplied to the coils 21A, 21C creates N poles in the radially inside section of the iron cores 20A, 20C of the stators 19A, 19C. Also, the alternating current AC1 supplied to the coils 21B, 21D creates S poles in the radially inside section of the iron cores 20B, 20D of the stators 19B, 19D. When the rotation angle is one hundred thirty-five degrees as shown in FIG. 6(b), the alternating current supplied to the coils 21A, 21C creates S poles in the radially inside section of the iron cores 20A, 20C of the stators 19A, 19C. Also, the alternating current AC1 supplied to the coils 21B, 21D creates N poles at the radially inner part of the iron cores 20B, 20D of the stators 19B, 19D.

Line F1 of FIG. 6(c) represents the driving torque generated by the motor 10 when the alternating current AC1 is supplied to the coils 21A, 21B, 21C, 21D. The torque F1 of the motor 10 periodically changes at rotation angles of ninety degrees. When the iron cores 20A, 20B, 20C, 20D substantially face the magnets 31A, 31B, 31C, 31D, as shown in FIGS. 4 and 6(a), the driving torque F1 corresponds to one of the indicated minimum locations F1s. When the iron cores 20A, 20B, 20C, 20D are displaced from the magnets 31A, 31B, 31C, 31D, as shown in FIGS. 5 and 6(b), the driving torque F1 corresponds to one of the indicated maximum locations F1m.

Since the compressor of FIGS. 1 to 6(d) has the four cylinder bores 131, 132, 133, 134, the net torque Eo has four minimum locations Eos and four maximum locations Eom. The motor 10 generates the driving torque F1 in accordance with electricity supplied from the controller C1. The driving torque F1 has four minimum locations F1s and four maximum locations F1m. The minimum sections Eos of the net torque Eo appear at substantially the same rotation angles as the minimum sections F1s of the driving torque F1, and the maximum sections Eom of the net torque Eo appear at substantially the same rotation angles as the maximum sections F1m of the driving torque F1. The driving torque F1 is always greater than the net torque Eo.

The rotary shaft 16 is rotated by supplying the alternating current AC1 to the coils 21A, 21B, 21C, 21D. While the rotary shaft 16 is rotated by one turn, refrigerant gas in the compression chamber 135 of each cylinder bore 131, 132, 133, 134 is discharged to the discharge chamber 143 one time.

The embodiment of FIGS. 1 to 6(d) has the following advantages.

Line G in FIG. 6(c) represents the torque generated by another type of motor, which is a prior art motor. The minimum sections Gs of the torque G appear at different rotation angles from the minimum sections Eos of the net torque Eo. The maximum sections Gm of the torque G appear at different rotation angles from the maximum sections Eom of the net torque Eo.

The minimum sections F1s of the torque F1 of the motor 10 appear at substantially the same rotation angles as the minimum sections Eos of the net torque Eo. The maximum sections F1m of the driving torque F1 appear at substantially the same rotation angles as the maximum sections Eom of the net torque Eo. Therefore, a motor generating high torque is not needed. Instead, the motor 10, which produces relatively small but sufficient torque F1, is used. Compared to the motor used in the prior art compressor, the size of the motor 10 is small, which reduces the size of the entire compressor.

In the embodiment of FIGS. 1 to 6(d), the number of the pistons 22 is four and the number of the poles in the motor 10 is also four. When the number of the pistons 22 matches the number of the poles in the motor 10, the rotation angles of the minimum sections Eos and the maximum sections Eom of the net torque Eo generally match the rotation angles of the minimum sections F1s and the maximum sections F1m of the driving torque F1. In other words, the cycle of the changes in the net torque Eo matches the cycle of the changes in the driving torque F1. Also, the phase of the net torque Eo substantially matches the phase of the driving torque F1. Therefore, such a matching structure is preferred to reduce the size of electric compressors.

An electric compressor according to a second embodiment of the present invention will now be described with reference to FIGS. 7(a) to 7(d).

The compressor of the second embodiment has three cylinder bores 131, 132, 133 located about the axis 161 of the rotary shaft 16. The compressor also has six stators 19A, 19B, 19C, 19D, 19E, 19F. The stators 19A, 19B, 19C, 19D, 19E, 19F have iron cores 20A, 20B, 20C, 20D, 20E, 20F and coils 21A, 21B, 21C, 21D, 21E, 21F, respectively. The rotor 30 has six magnets 31A, 31B, 31C, 31D, 31E, 31F. Otherwise, the structure of the compressor shown in FIGS. 7(a) to 7(d) is the same as that shown in FIGS. 1 to 6(d).

Lines H1, H2, H3 represent changes of the load torque applied to the rotary shaft 16 from the compression chambers 135 of the cylinder bores 131, 132, 133. Line Ho represents the resultant of the torques, or the net torque, represented by the lines H1, H2, H3. The net torque Ho periodically changes at rotation angles of one hundred and twenty degrees. Maximum sections Hom of the net torque Ho appear at rotation angles of one hundred and ten degrees, two hundred and thirty degrees and three hundred and fifty degrees. Minimum sections Hos of the net torque Ho appear at rotation angles of eighty degrees, two hundred degrees and three hundred and twenty degrees.

A controller C2 supplies an alternating current AC2, which is shown in FIG. 7(d), to the coils 21A, 21C, 21E. The controller C2 also supplies an alternating current AC3, which is shown in FIG. 7(d), to the coils 21B, 21D, 21F. Line F2 shown in FIG. 7(c) represents torque generated by the motor when the current AC2 is supplied to the coils 21A, 21C, 21E and the current AC3 is supplied to the coils 21B, 21D, 21F.

The torque F2 of the motor 10A periodically changes at rotation angles of sixty degrees. When the iron cores 20A, 20B, 20C, 20D, 20E, 20F substantially face the magnets 31A, 31B, 31C, 31D, 31E, 31F as shown in FIG. 7(b), the driving torque F2 is in minimum sections F2s. When the iron cores 20A, 20B, 20C, 20D, 20E, 20F are displaced from the magnets 31A, 31B, 31C, 31D, 31E, 31F by thirty degrees, the driving torque F2 is in maximum sections F2m.

In the embodiment of FIGS. 7(a) to 7(d), the compressor has three pistons (not shown) and the motor 10A has six poles. Like the embodiment of FIGS. 1 to 6(d), the motor 10A need not produce great torque, which reduces the size of the compressor.

A third embodiment of the present invention will now be described with reference to FIGS. 8(a) to 8(d).

Figure 8A:
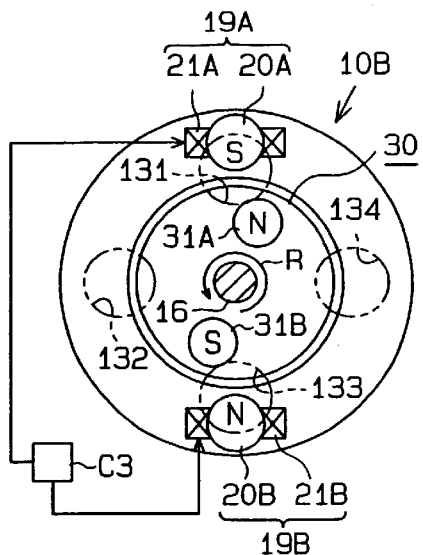
FIG. 8(a) is a diagrammatic view showing an electric motor according to a third embodiment of the present invention in which magnets face iron cores.

Stators 19A, 19B have iron cores 20A, 20B and coils 21A, 21B, respectively. A rotor 30 has two magnets 31A, 31B. Otherwise, the structure of the compressor shown in FIGS. 8(a) and 8(d) is the same as that shown in FIGS. 1 to 6(d).

Figure 8B:
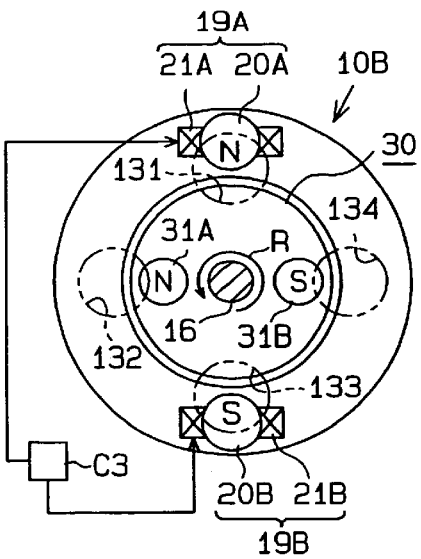
FIG. 8(b) is a diagrammatic view showing the motor of FIG. 8(a) in which the magnets are displaced from the iron cores by ninety degrees.
Figure 8C:
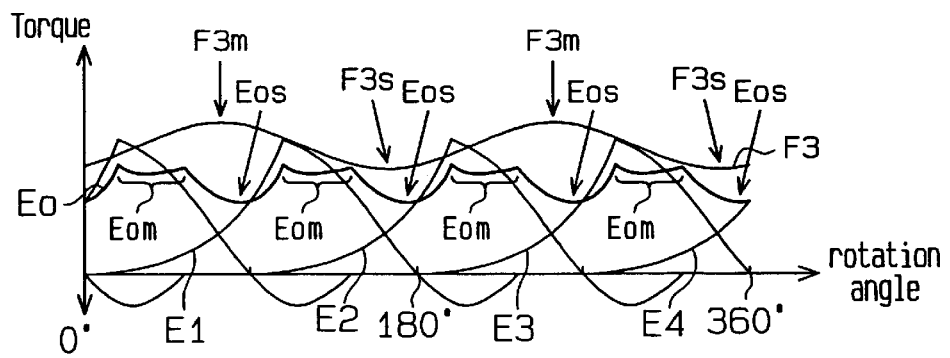
FIG. 8(c) is a graph showing changes of a net load torque and changes of a driving torque in the motor of FIGS. 8(a) and 8(b)
Figure 8D:
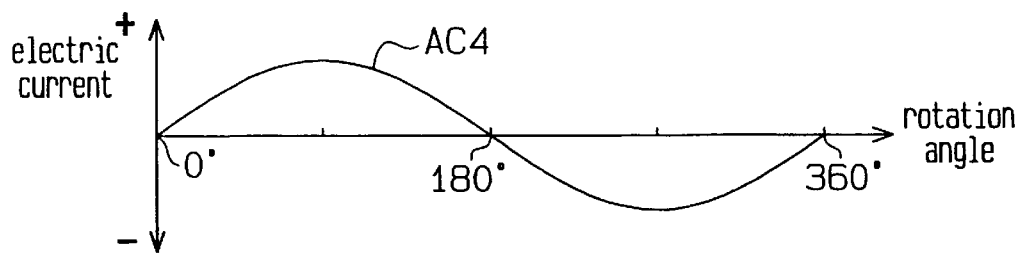
FIG. 8(d) is a graph showing electricity supplied to the stator coils in the motor of FIGS. 8(a) and 8(b)

A controller C3 supplies an alternating current AC4, which is shown in FIG. 8(d), to the coils 21A, 21B. Line F3 in FIG. 8(c) represents the torque generated by the motor 10B when the current AC4 is supplied to the coils 21A, 21B. The torque F3 of the motor 10B periodically changes at rotation angles of one hundred eighty degrees. When the iron cores 20A, 20B substantially face the magnets 31A, 31B as shown in FIG. 8(a), the torque F3 is in the minimum section F3s. When the iron cores 20A, 20B is displaced from the magnets 31A, 31B as shown in FIG. 8(b), the driving torque F3 is in the maximum section F3m.

In the embodiment of FIGS. 8(a) to 8(d), the compressor has four pistons (not shown), and the motor 10B has two poles. Like the embodiment of FIGS. 1 to 6(d), the motor 10B need not produce great torque, which reduces the size of the compressor.

A scroll type compressor according to a fourth embodiment of the present invention will now be described with reference to FIGS. 9 to 11.

Figure 9:
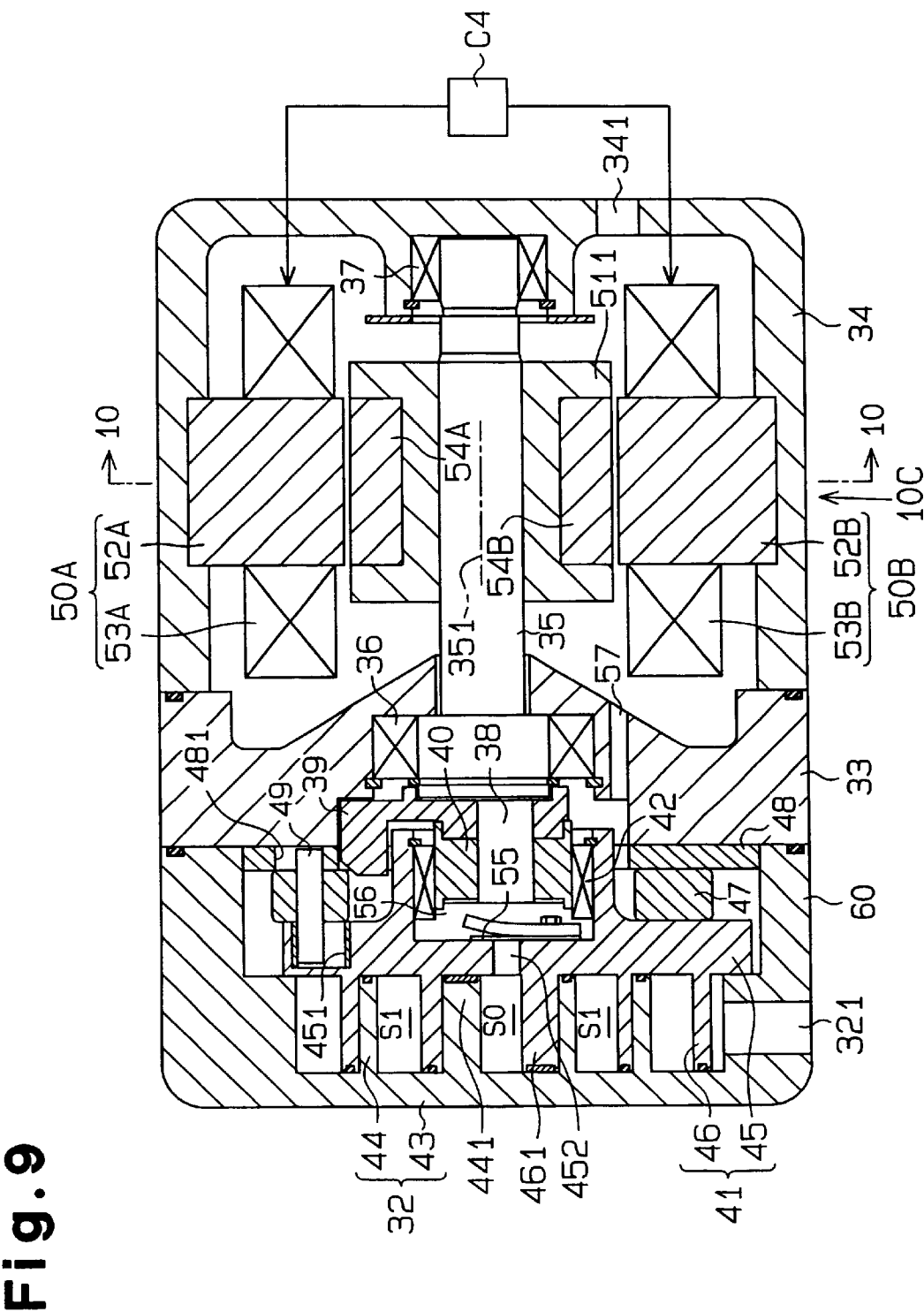
FIG. 9 is a cross-sectional view illustrating a compressor according to a fourth embodiment.

As shown in FIG. 9, a stationary scroll 32 is coupled to a center housing member 33. The center housing member 33 is coupled to the motor housing member 34. The center housing member 33 and the motor housing member 34 support a rotary shaft 35 through radial bearings 36, 37. An eccentric shaft 38 is integrally formed with the rotary shaft 35. A passage 57 is formed in the center housing member 33. The passage 57 connects the interior of the scroll housing member 60 with the interior of the motor housing member 34.

The eccentric shaft 38 supports a counterweight 39 and a bushing 40. A movable scroll 41 is supported by the bushing 40 through a needle bearing 42 and rotates relative to the bushing 40. The movable scroll 41 faces the stationary scroll 32. A space 56 is defined by the bushing 40, the eccentric shaft 38, the stationary scroll 32 and the movable scroll 41. The stationary scroll 32 includes a stationary base plate 46 and a stationary volute portion 44, and the movable scroll 41 includes a movable base plate 45 and a movable volute portion 46. The base plates 43, 45 and the volute portions 44, 46 define pockets S1, S0. As the eccentric shaft 38 rotates, the movable scroll 41 orbits about the axis of the rotary shaft 16. Centrifugal force created by the orbital movement of the movable scroll 41 is cancelled by the counterweight 39.

A ring 47 is located between the movable base plate 45 and the center housing member 33. Cylindrical pins 49 (only one is shown in FIG. 9) are secured to the ring 47. An annular pressure receiving plate 48 is located between the center housing member 33 and the ring 47. The plate 48 has holes 481, the positions of which correspond to the positions of the pins 49. Also, the movable base plate 45 has holes 451, the positions of which correspond to the positions of the pins 49. The holes 481, 451 are arranged in aligned pairs at equal angular intervals about the axis of the rotary shaft 35. The ends of each pin 49 are fitted in the corresponding pair of the holes 281, 451.

Figure 10:
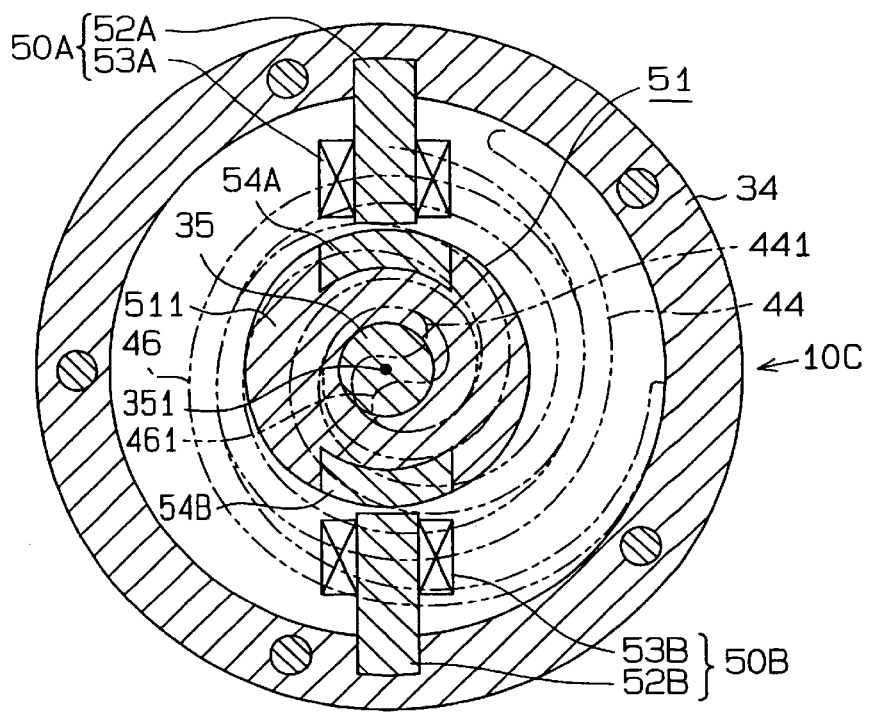
FIG. 10 is a cross-sectional view taken along line 10—10 of FIG. 9.
Figure 11:
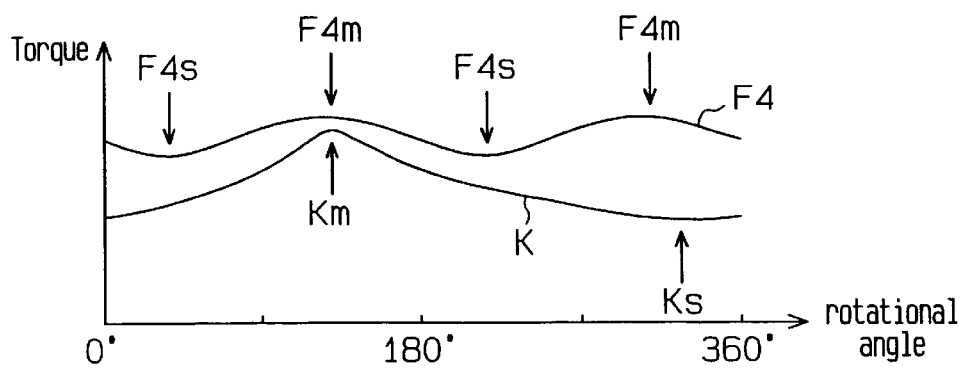
FIG. 11(a) is a graph showing changes of a net torque and changes of a driving torque in the motor of FIGS. 9 and 10.
FIG. 11(b) is a graph showing electricity supplied to the stator coils in the motor of FIGS. 9 and 10.
Figure 11:
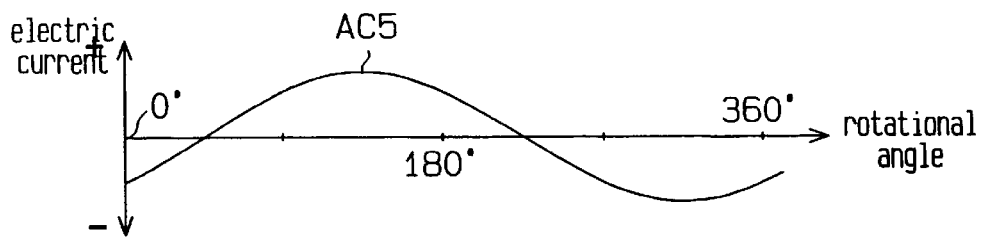

As shown in FIG. 10, a motor 10C is accommodated in the motor housing member 34. The motor 10C includes stators 50A, 50B located on the inner surface of the motor housing member 34 and a rotor 51 fixed to the rotary shaft 35. The stator 50A includes an iron core 52A and a coil 53A wound about the iron core 52A. The stator 50B includes an iron core 52B and a coil 53B wound about the iron core 52B. The rotor 51 includes a support cylinder 511 fixed to the rotary shaft 35 and a pair of magnets 54A, 54B fixed to the support cylinder 511. The iron cores 52A, 52B are arranged at equal angular intervals (one hundred eighty degrees) about the axis of the rotary shaft 35. The N pole of one of the magnets 54A is located radially outside and the S pole of the other magnet 54B is located radially outside.

As the eccentric shaft 38 rotates, the movable scroll 41 orbits. As the movable scroll 41 orbits, refrigerant gas is drawn into the space between the base plate 43 and the movable scroll base plate 45 from an inlet 321. As the movable scroll 41 orbits, the surface of each pin 49 slides along the inner walls of the corresponding pair of the holes 451, 481. The diameter d1 of the holes 451, 481, the diameter d2 of each pin 49 and the orbit radius r of the bushing 40 satisfy the following equation:

$$d1=d2+r$$

Accordingly, the orbit radius of the movable scroll 41 is r, and the ring 47 orbits at half the orbit radius r of the movable scroll 41.

Each pin 49 contacts the inner surface of the corresponding hole 481, which prevents the ring 47 from rotating. The inner wall of each hole 451 contacts the corresponding pin 49 on the ring 47, which does not rotate. The movable scroll 41 is therefore not rotated. That is, the movable scroll 41 and the ring 47 do not rotate about their own axes but orbit along predetermined paths. As the movable scroll 41 orbits, the pockets S1, S0 move toward the inner ends 441, 461 of the volute portions 44, 46. As it moves, the volume of each pocket S1, S0 decreases.

A discharge port 452 is formed in the movable base plate 45. The discharge port 452 opens to the pocket S0, when the pocket S0 is at the final stage. The discharge port 452 is opened and closed by a discharge valve flap 55. As the volume of each pocket S1, S0 decreases, the refrigerant gas in the pocket S1, S0 is compressed. The gas is then discharged to the space 56 from the pocket S0 through the discharge port 452. The gas is then flows to the interior of the motor housing member 34 through the needle bearing 42 through the passage 57 formed in the center housing member 33. Refrigerant gas in the motor housing member 34 is discharged to an external refrigerant circuit through an outlet 341 formed in the end wall of the motor housing member 34.

Line K of FIG. 11(a) represents a resultant of torques, or the net torque, applied to the rotary shaft 35 due to the compression reaction forces of the pockets S1, S0. The net torque K periodically changes at rotation angles of three hundred and sixty degrees. The net torque K corresponds to a maximum location Km at an angle of one hundred and thirty degrees. The net torque K corresponds to a minimum location Ks at an angle of three hundred and ten degrees.

A controller C4 supplies an alternating current AC5, which is shown in FIG. 11(b). Line F4 of FIG. 11(a) represents a torque generated by supplying the current AC5 to the coils 53A, 53B. The torque F4 of the motor 10C periodically changes at an angle of one hundred eighty degrees. As shown in FIG. 10, the driving torque F4 corresponds the maximum section F4m when the iron cores 52A, 52B face the magnets 54A, 54B. When the iron cores 52A, 52B are at rotation angles of forty degrees and two hundred and twenty degrees, that is, when the iron cores 52A, 52B are displaced from the magnets 54A, 54B by ninety degrees, the driving torque F4 corresponds to the minimum section F4s. One of the maximum sections Km of the net torque K appears at the same rotation angle as the maximum section F4m of the driving torque F4. The driving torque F4 is always greater than the net torque K.

Like the embodiment of FIGS. 1 to 6(d), the embodiment of FIGS. 9 to 11(d) uses a motor generating a relatively small torque.

It should be apparent to those skilled in the art that the present invention may be embodied in many other specific forms without departing from the spirit or scope of the invention. Particularly, it should be understood that the invention may be embodied in the following forms.

The present invention may be applied to any electric compressors as long as the number of the pistons is a number computed by multiplying the number of the poles of the motor by an integer.

The present invention may be applied to any electric compressors as long as the number of the poles of the motor is a number computed by multiplying the number of the pistons by an integer.

Therefore, the present examples and embodiments are to be considered as illustrative and not restrictive and the invention is not to be limited to the details given herein, but may be modified within the scope and equivalence of the appended claims.

What is claimed is:

1. An electric compressor comprising:
   an electric motor, wherein the motor generates driving torque;
   a rotary shaft driven by the motor; and
   a plurality of compression members for compressing gas in accordance with rotation of the rotary shaft,
   wherein rotation angles of the rotary shaft at which load torques generated by the individual compression members are maximum are different from rotation angles of the rotary shaft at which the driving torque of the motor is maximum;
   wherein during one turn of the rotary shaft, at least one occurrence of a minimum net load torque generated by the compression members occurs at substantially the same rotational angles as at least one occurrence of a minimum driving torque of the motor;
   wherein during one turn of the rotary shaft, at least one occurrence of a maximum net load torque generated by the compression members occurs at substantially the same rotational angles as at least one occurrence of a maximum driving torque of the motor; and
   wherein a magnitude of the driving torque is always greater than a magnitude of the net load torque.

2. The electric compressor according to claim 1, wherein, during the one turn, the number of times when the net load torque is minimum is an integer multiple of the number of times when the driving torque of the motor is minimum.

3. The electric compressor according to claim 2, wherein, during the one turn, the number of times when the net load torque is minimum is equal to the number of times when the driving torque of the motor is minimum.

4. The electric compressor according to claim 2, wherein, during the one turn, all the times when the net load torque is minimum and all the times when the driving torque of the motor is minimum occur at substantially the same rotational angles.

5. The electric compressor according to claim 1, wherein, during the one turn, the number of times when the driving torque of the motor is maximum is an integer multiple of the number of times when the net load torque is maximum.

6. The electric compressor according to claim 5, wherein, during the one turn, the number of times when the driving torque of the motor is maximum is equal to the number of times when the net load torque is maximum.

7. The electric compressor according to claim 1, wherein the compression members include a plurality of pistons that are arranged about the axis of the rotary shaft, and wherein the electric compressor is a piston type compressor that reciprocates the pistons in accordance with the rotation of the rotary shaft.

8. The electric compressor according to claim 7, wherein the rotary shaft is rotated by one turn while the motor rotates one turn, and wherein the number of the pistons is an integer multiple of the number of poles of the motor.

9. The electric compressor according to claim 8, wherein the number of the pistons is equal to the number of poles of the motor.

10. The electric compressor according to claim 7, wherein the rotary shaft is rotated by one turn while the motor rotates one turn, and wherein the number of poles of the motor is an integer multiple of the number of the pistons.

11. The electric compressor according to claim 10, wherein the number of poles of the motor is equal to the number of the pistons.

12. An electric compressor comprising:
    an electric motor, wherein the motor generates driving torque;
    a rotary shaft driven by the motor; and
    a plurality of compression members for compressing gas in accordance with rotation of the rotary shaft,
    wherein the number of compression members is equal to the number of poles of the electric motor;
    wherein during one turn of the rotary shaft, each occurrence of a minimum net load torque generated by the compression members occurs at substantially the same rotational angles as each occurrence of a minimum driving torque of the motor;
    wherein during one turn of the rotary shaft, each occurrence of a maximum net load torque generated by the compression members occurs at substantially the same rotational angles as each occurrence of a maximum driving torque of the motor; and
    wherein a magnitude of the driving torque is always greater than a magnitude of the net load torque.

13. The electric compressor according to claim 12, wherein rotation angles of the rotary shaft, at which load torques generated by the individual compression members are maximum, are respectively different from the rotation angles of the rotary shaft, at which the driving torque of the motor is maximum.

14. The electric compressor according to claim 13, wherein the electric compressor is a scroll type compressor comprising a fixed scroll and movable scroll, which work in combination to compress a fluid, the movable scroll orbiting with respect to the stationary scroll in accordance with rotation of the rotary shaft.

15. An electric compressor comprising:
    an electric motor, wherein the motor generates driving torque;
    a rotary shaft driven by the motor; and
    a plurality of compression members for compressing gas in accordance with rotation of the rotary shaft;

wherein rotation angles of the rotary shaft at which load torques generated by the individual compression members are maximum are different from rotation angles of the rotary shaft at which the driving torque of the motor is maximum;

wherein the number of the compression members is equal to the number of poles of the electric motor;

wherein, during one turn of the rotary shaft, each time the net load torque is maximum occurs at that same rotational angle as each time the driving torque of the motor is maximum; and wherein the magnitude of the driving torque is always greater than that of the net load torque.

16. The electric compressor according to claim 15, wherein all the times when the net load torque generated by the compression members is minimum and all the times when the driving torque of the motor is minimum occur at substantially the same rotational angles.

17. The electric compressor according to claim 15, wherein the compression members are a plurality of pistons.

18. The electric compressor according to claim 17, wherein the electric compressor is a piston type compressor that reciprocates the pistons in accordance with rotation of the rotary shaft.

19. The electric compressor according to claim 18, wherein the number of pistons is equal to or greater than four.

* * * * *

UNITED STATES PATENT AND TRADEMARK OFFICE
CERTIFICATE OF CORRECTION

PATENT NO.    : 6,532,858 B2
DATED         : March 18, 2003
INVENTOR(S)   : Fujii et al.

It is certified that error appears in the above-identified patent and that said Letters Patent is hereby corrected as shown below:

<u>Title page,</u>
Item [56], FOREIGN PATENT DOCUMENTS, please delete
"JP    05 187356 A    7/1993    ……………..F04B/27/08" and insert therefore
-- DE    197 33 147 C1  11/1998    ……………..H02K/7/14 --.

Signed and Sealed this

Fifth Day of August, 2003

JAMES E. ROGAN
*Director of the United States Patent and Trademark Office*